US008576216B2

(12) United States Patent
Correa et al.

(10) Patent No.: US 8,576,216 B2

(45) Date of Patent: Nov. 5, 2013

(54) METHOD AND APPARATUS FOR REDUCING DRIVER ENERGY CONSUMPTION

(75) Inventors: Carlos Correa, Villingen-Schwenningen (DE); Cédric Thébault, Chantepie (FR)

(73) Assignee: Thomson Licensing, Issy les Moulineaux (FR)

( * ) Notice: Subject to any disclaimer, the term of this patent is extended or adjusted under 35 U.S.C. 154(b) by 358 days.

(21) Appl. No.: 12/818,251

(22) Filed: Jun. 18, 2010

(65) Prior Publication Data

US 2010/0321374 A1 Dec. 23, 2010

(30) Foreign Application Priority Data

Jun. 18, 2009 (EP) .................................... 09305560

(51) Int. Cl.
*G06F 3/038* (2006.01)
*G09G 5/00* (2006.01)
*G09G 3/28* (2006.01)

(52) U.S. Cl.
USPC ............................................ 345/212; 345/60

(58) Field of Classification Search
USPC ................................................... 345/212, 60
See application file for complete search history.

(56) References Cited

U.S. PATENT DOCUMENTS

2004/0008162 A1 1/2004 Kim et al.
2004/0021621 A1 2/2004 Kim et al.
2006/0012547 A1 1/2006 Chang
2008/0136745 A1* 6/2008 Takayama ........................ 345/60
2009/0179889 A1* 7/2009 Jang .............................. 345/212
2009/0184953 A1* 7/2009 Yamashita et al. ............ 345/212

FOREIGN PATENT DOCUMENTS

EP 1850313 A1 8/2006

OTHER PUBLICATIONS

European Search Report date Nov. 6, 2009 for EP Application No. 09 30 5560.

* cited by examiner

*Primary Examiner* — Nicholas Lee
(74) *Attorney, Agent, or Firm* — Tutunjian & Bitetto, P.C.

(57) ABSTRACT

Method and apparatus for reducing driver energy consumption of drivers of a display device each supplied by an input codeword as e.g. for data drivers of a plasma display panel supplied by sequences of subfield data bits in form of a codeword comprising a predetermined number of bits are recommended, wherein the apparatus comprises a driver transition energy limitation circuit for toggling bits of the input codeword applied to the driver transition energy limitation circuit and providing a codeword reducing the driver energy consumption. A toggle map, which is generated from a combination of a transition map determining a bit in the input codeword if toggled reduces energy consumption and a flag map determining a number of least significant bits exceeding a cell energy limit value, is applied to an input codeword for the driver to toggle bits of said input codeword for reducing driver energy consumption without a perceivable image quality degradation. Method and apparatus are advantageously applicable for driver overheat protection and eco mode to reduce driver energy consumption without a perceivable image quality degradation.

10 Claims, 7 Drawing Sheets

METHOD AND APPARATUS FOR REDUCING DRIVER ENERGY CONSUMPTION

This application claims the benefit, under 35 U.S.C. §119 of European Procedure Patent Application 09305560.6, filed Jun. 18, 2009.

FIELD OF THE INVENTION

The invention relates to a method and an apparatus to reduce driver energy consumption as e.g. for data drivers of a plasma display panel without perceivable image quality degradation and to apply it for driver overheat protection as well as for an eco mode.

BACKGROUND OF THE INVENTION

Plasma displays are driven by column drivers and line drivers. Line drivers are used in selecting the line to be addressed, and the column drivers are used to write video data on the panel. The column drivers are mostly referred as data drivers. The load of the data drivers is essentially a capacitive load, which means that power dissipation and energy consumption on the data drivers will be basically determined by the amount of data transitions occurred in the process of data writing. A typical picture to be displayed on a plasma panel will cause a typical load on the data drivers. However, less than one percent of the pictures may cause a very high number of transitions at the output of the data drivers, causing driver overheating. A possibility to avoid overheating is to add large cooling metal plates or even fans. Those cooling methods require a lot of temperature sensors or are not reliable. Therefore, such cooling methods seem to be wasteful in terms of resources, when taken into consideration that overheating typically occurs only for less than one percent of the pictures. Therefore it already has been recommended to evaluate the output data of the drivers concerning the number of data transitions to estimate the temperature of each data driver. As countermeasures to avoid overheating it already has been recommended to reduce the number of subfields or to reduce the panel gain. Unfortunately, said means to avoid overheating severely degrade the picture quality, in a visible way. A reduced panel gain leads to darker picture and less picture brightness arbitrates the impression that the panel works not properly. A reduced number of subfields causes and increases the number of quantization errors in a not acceptable way and is not effective for all pictures as e.g. if overheating is caused by the most significant subfields, cutting off least significant subfields will be of limited use. Furthermore, plasma displays generate pictures of high contrast with a real black level compared to the lighter grey of the unilluminated parts of an LCD screen, however, are often criticized for power consumption as power consumption varies greatly with picture content, with bright scenes drawing significantly more power than darker ones. Therefore, also an energy recovery driver circuit for the AC plasma display panel having an enhanced energy recovery efficiency with a short voltage rise and fall period has been recommended.

SUMMARY OF THE INVENTION

It is an aspect of present invention to provide a method and an apparatus to reduce driver energy consumption as e.g. for data drivers of a plasma display panel without perceivable image quality degradation, which may be used for overheat protection, however, also may be used to drive the plasma display panel in a so-called eco mode with less power consumption. That means that it is an aspect of the present invention to provide a method and an apparatus to reduce the energy consumption of the data drivers without a perceivable image quality degradation and it is a further aspect of the present invention to improve the reliability of driver overheat protection without a perceivable image quality degradation.

This object is achieved by means of features specified in independent patent claims. Other advantageous refinements and developments of the invention are specified in dependent claims.

As the load of the data drivers is essentially a capacitive load, which means that power dissipation and energy consumption on the data drivers will be basically determined by the amount of data transitions occurred in the process of data writing, it may be expected that the energy consumption of data drivers may be reduced by reducing the number of bit transitions in the codeword applied to a driver to display a picture on a plasma display panel. However, in a matrix of cells of a plasma display also bit transitions in view of neighbouring cells, which also could be altered, have to be taken into account, so that even a higher number of bit transitions in a codeword applied to a driver may reduce the energy consumption of the display panel as it is shown in an embodiment of the invention. Furthermore, it is also not imaginable in which manner it could be possible to reduce the number of bit transitions without a perceivable image quality degradation as bit transitions depend on the content of video information, which determines the cells of the plasma display, which have to be illuminated.

Accordingly, in one aspect the invention provides a method to reduce driver transition energy consumption of drivers of a display device each supplied by an input codeword as e.g. for data drivers of a plasma display panel supplied by sequences of subfield data bits in the form of a codeword comprising a predetermined number of bits without a perceivable image quality degradation, wherein

- a toggle map is applied to the input codeword for the driver to toggle bits of said input codeword to reduce the driver energy consumption,
- the toggle map is formed by a combination of
- a flag map indicating a number of low significant bits exceeding a predetermined cell energy limit and may be toggled with
- a transition map denoting a bit, that if toggled reduces the driver energy consumption and being generated by comparing
- an input energy map with a toggle energy map,
- the toggle energy map is based on an inversion of the input codeword and wherein both said input energy map and said toggle energy map are generated by bitwise applying an energy evaluation schema to transitions with respect to neighbouring cells, which determine said energy maps.

That means that the method of the present invention is based on the principle that a toggle map being a combination of a transition map determining a bit in a codeword if toggled reduces the energy consumption and a flag map determining a number of lower significant bits exceeding a predetermined energy consumption value is applied to an input codeword for the driver to toggle bits of said input codeword to reduce driver energy consumption without a perceivable image quality degradation.

That means that the present invention limits on a cell by cell basis the total number of bit transitions, which represents the load and power consumption of the drivers. Each cell of the display is lined with either a red, green or blue phosphor, a material that glows when exposed to radiation and the three cells—one red, one blue and one green—combine to produce one pixel.

Said toggle map, which is applied to the input codeword for the driver is formed from a combination of a transition map determining a bit in a codeword if toggled reduces transition energy consumption and a flag map determining a number of least significant bits exceeding a certain energy consumption value, ensures that only high energy subfields of least significant subfields will be toggled, which exceed a current cell energy limit and low energy subfields of least significant subfields as well as high energy subfields of most significant subfields will not be toggled and left unmodified. Consequently, the number of subfields will not be reduced and the number of quantization errors will not increase and also the gain of the display panel is not reduced, so that a reduced driver transition energy consumption without a perceivable image quality degradation is ensured.

The further aspect of the present invention to improve the reliability of driver overheat protection without a perceivable image quality degradation is realised by controlling the cell energy limit mentioned above dependent on an overheat signal provided by an overheat signal generator, which counts sub-field data bits the value of which differs from that of a neighbouring or preceding sub-field data bit and provides a respective signal being a measure of the amount of toggling activity representative for rise in temperature of a driver. Such an overheat signal generator e.g. already has been recommended according to EP 1 821 278 A1. That means that the above-mentioned method in addition to an eco mode is also applicable for an overheat protection without a perceivable image quality degradation. However, as the above mentioned method to reduce driver transition energy consumption requires a flag map determining a number of least significant bits exceeding a predetermined energy consumption value, a respective signal being a measure of the amount of toggling activity representative for rise in temperature of a driver seems to be necessary, so that according to a preferred embodiment the above-mentioned method for driver overheat protection is also advantageously applicable for said eco mode. The advantage becomes clear from the apparatus to reduce driver transition energy consumption as an overheat control circuit to control a driver transition energy limitation circuit advantageously will be used for overheat protection as well as for said eco mode, so that said eco mode almost will be realised without any additional expenditure.

Moreover, the above object is solved by an apparatus to reduce driver transition energy consumption of drivers of a display device each supplied by an input codeword as e.g. for data drivers of a plasma display panel supplied by sequences of subfield data bits in the form of a codeword comprising a predetermined number of bits, wherein the apparatus comprises a driver transition energy limitation circuit having a first gate for toggling bits of the input codeword applied to the driver transition energy limitation circuit connected to an overheat and/or eco control circuit converting an overheat value into a cell energy limit value and wherein said first gate is connected to a second gate supplied by a flag map and a transition map for toggling bits of the input codeword reducing the number of transitions by the codeword applied to the driver. According to an embodiment of the invention said flag map is provided by a comparator comparing an accumulated energy map with a cell energy limit and said transition map is provided by a comparator comparing input energy and toggle energy. The outputs of said comparators are applied to said second gate and the cell energy limit value is provided by said overheat and/or eco control circuit. Input energy as well as toggle energy values are provided by an lookup table for energy evaluation of neighbouring cells by applying said lookup table on the subfield codeword of said cells. The overheat and/or eco control circuit provides the cell energy limit value, which is applicable for overheat protection as well as for an eco mode to reduce power consumption without a perceivable image quality degradation. As the recommended overheat and/or eco control circuit converts an overheat value, as e.g. provided by a known overheat signal generator similar to EP 1 821 278 A1, into a cell energy limit value, such an overheat value is also applicable to realise an eco mode.

Energy consumption of the plasma display device is reduced by said eco mode even in absence of overheating and the apparatus integrates the total cell subfield energy starting from the most significant subfields, and only if a certain energy threshold for a cell is reached said toggling of bits according to the present invention is applied. Driver transition energy consumption is reduced by modifying subfield data in a manner that most significant subfields are left un-modified and bits of least significant subfields are toggled if toggling results in less driver energy consumption.

That means that also sensitive darker parts of pictures will not be negative affected and visible artifacts avoided.

Furthermore, the proposed overheat protection is based on a cell energy limit, which by taking into account the total number of transitions on a cell by cell basis improves the reliability of driver overheat protection with low expenditure and without a perceivable image quality degradation.

The specific nature of the invention as well as other objects, advantages, features and uses of the invention will become evident from the following description of a preferred embodiment taken in conjunction with the accompanying drawings.

BRIEF DESCRIPTION OF THE DRAWINGS

Exemplary embodiments of the invention are described with reference to the accompanying drawings, which show in.

DETAILED DESCRIPTION OF EMBODIMENTS

Like numerals and characters designate like elements throughout the figures of the drawings.

Figure 1:
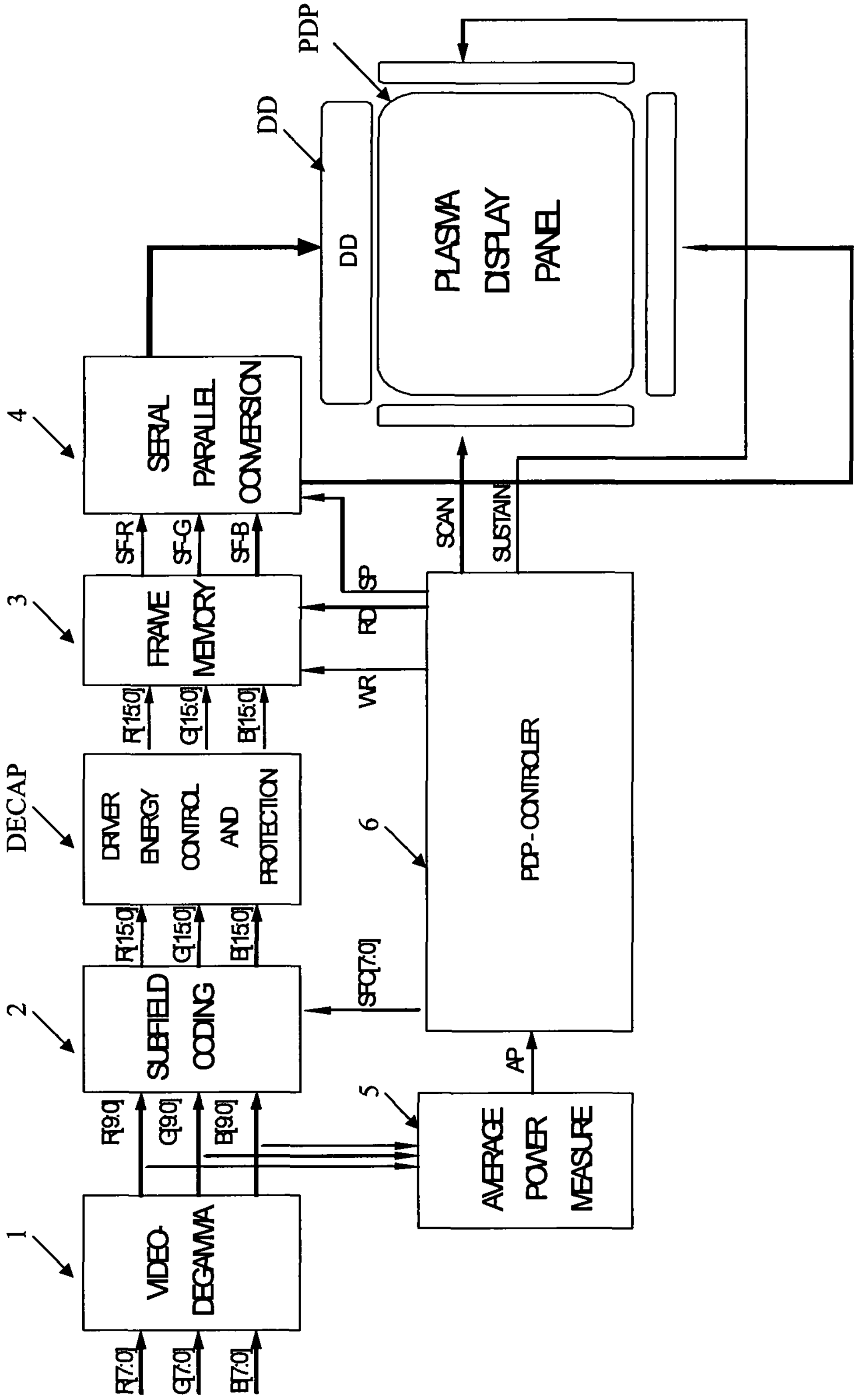
FIG. 1 a block diagram of a plasma display device including a driver energy control and protection circuit, FIG. 2 a block diagram of an apparatus for reducing driver transition energy consumption according to the invention, FIG. 3 a block diagram of an overheat and/or eco control circuit of FIG. 2, FIG. 4 schematic of cells of a plasma display panel, FIG. 5 flowchart illustrating method steps of an embodiment, FIG. 6 a block diagram of a driver transition energy circuit of FIG. 2 and FIG. 7 a block diagram of an energy limitation cell of FIG. 6.

Reference is initially directed to FIG. 1, which generally illustrates main components of a plasma display device including a driver energy control and protection circuit. A plasma display device typically comprises a video degamma means 1 supplied by eight bit video signals representing the basic colours red R, green G and blue B. The number of bits is indicated by figures in square brackets in the accompanying drawings, wherein e.g. [7:0] represents an eight bit word where the most significant bit is on the left side. Said video degamma means 1 transforms in a known manner the eight bit video signals in 10 bit video signals applied to both a subfield coding means 2 and an average power measure means 5, which provides an average power signal AP concerning the picture load for a plasma display controller 6 connected to the average power measure means 5. Plasma display controller 6 controls in a conventional manner the subfield coding means 2 e.g. with a subfield codeword SFC[7:0], a frame memory 3 with a write signal WR and a read signal RD as well as a serial parallel conversion means 4 with a serial parallel conversion signal SP and provides scan pulses SCAN and sustain pulses SUSTAIN.

FIG. 1 illustrates that a driver energy control and protection circuit DECAP according to the invention is arranged between the subfield coding means 2 and the frame memory 3 of a plasma display device for toggling bits of an input codeword to reduce driver transition energy consumption. That means that the driver energy control and protection circuit DECAP according to the invention with low expenditure may be implemented in current plasma display devices, which furthermore typically comprise a serial parallel conversion means 4 connected to the frame memory 3 for supplying column drivers and line drivers driver of the plasma display panel PDP. Line drivers are used to select a line to be addressed, and the column drivers are used to write video data on the panel. The column drivers are mostly referred as data drivers DD. The load of said data drivers DD is essentially capacitive which means that power dissipation on the data drivers will be basically determined by the amount of data transitions occurred in the process of data writing on the plasma display panel PDP, which is reduced according to the present invention.

Figure 2:
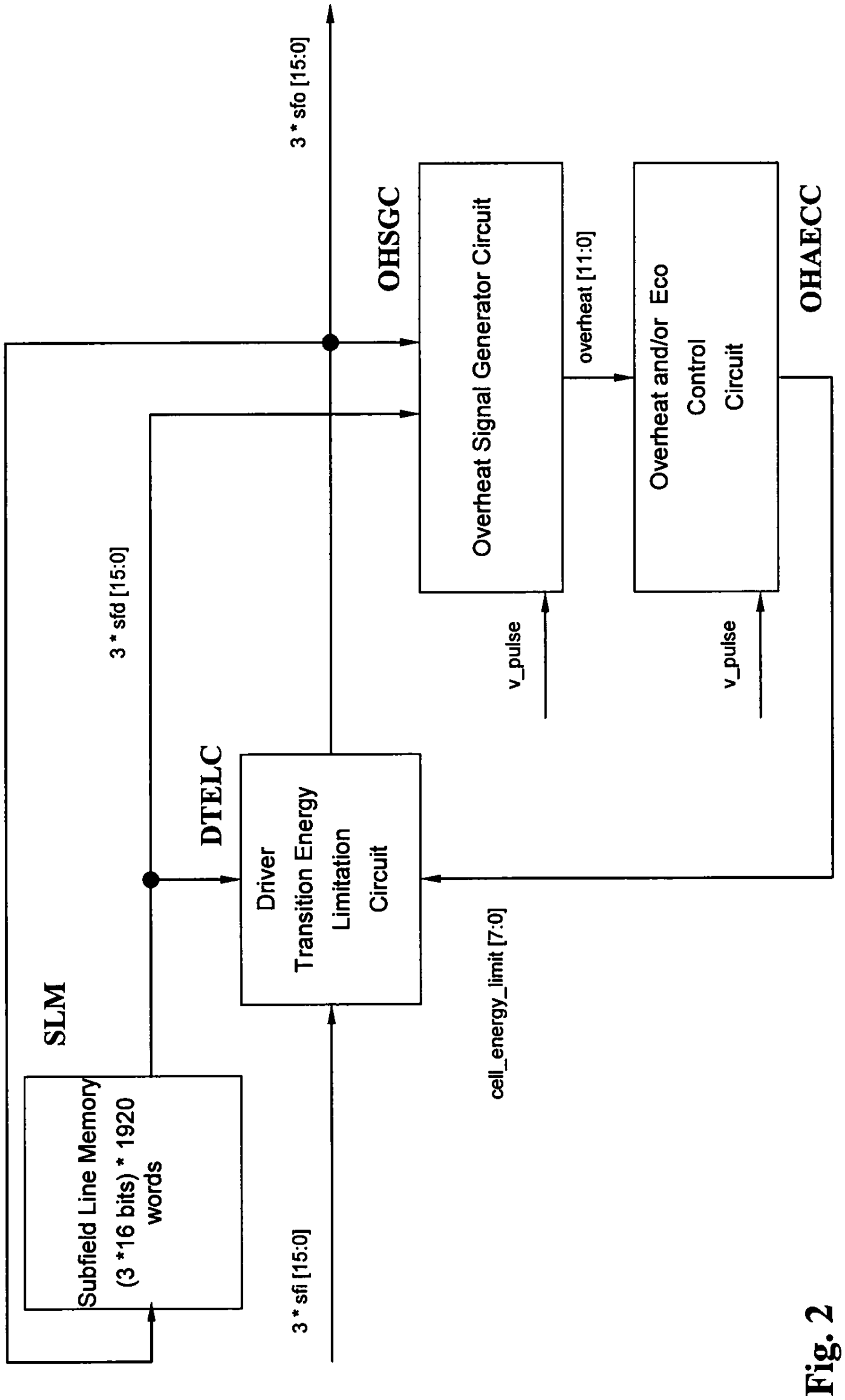
Figure 3:
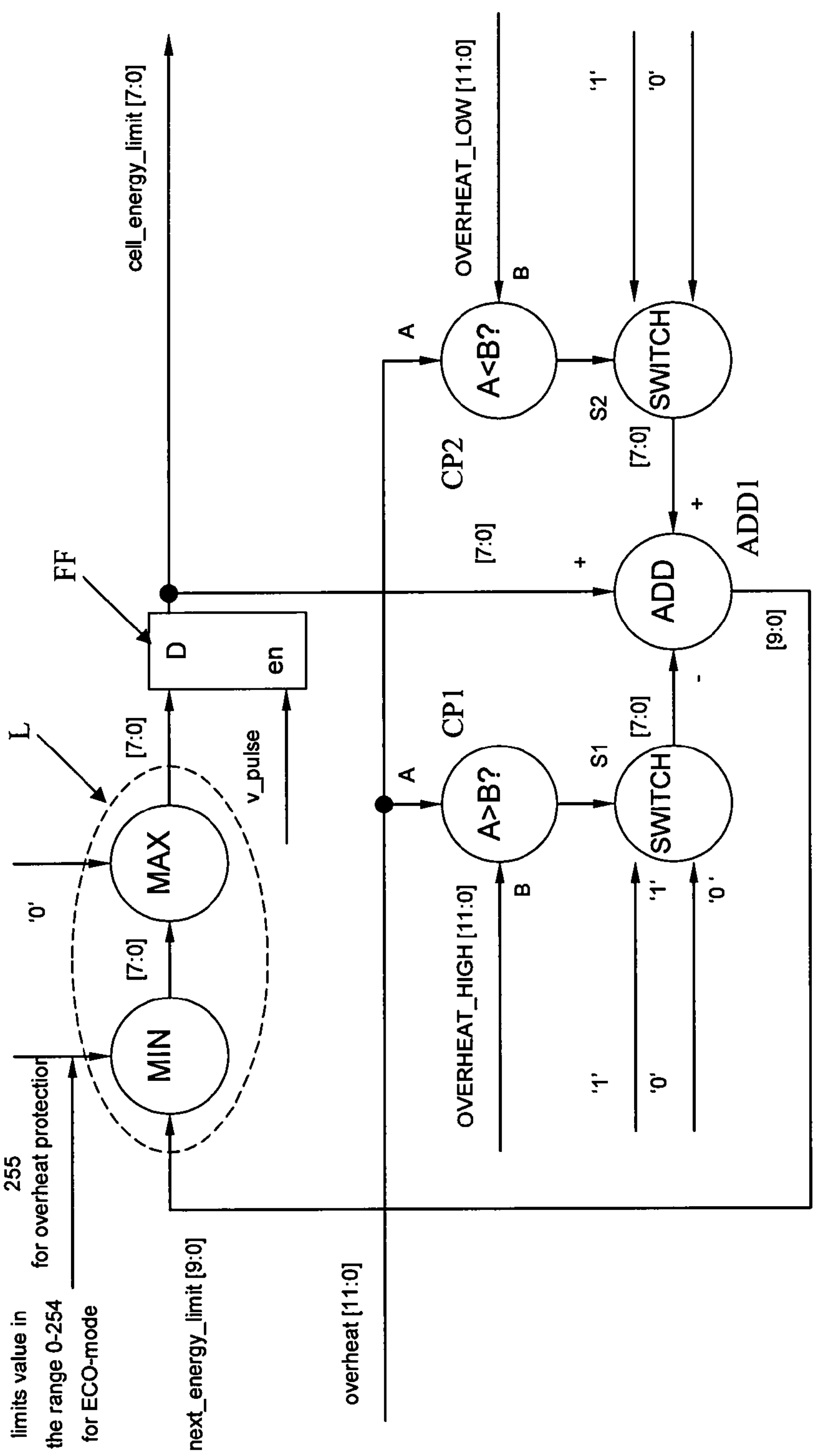

It is an aspect of the invention to improve plasma display overheating countermeasures in case that driver overheating is detected. The recommended method and circuit limit on a cell by cell basis the total number of transitions, which a panel cell generates with data drivers DD. For each cell of the display panel, the subfields e.g. 9 to 16 are evaluated and it is estimated for each subfield, which is either 0 or 1, the amount of energy, which will be created. Furthermore, the possibility to toggle some subfields in order to reduce the amount of energy is investigated. Toggling candidates are of course only those subfields which if toggled generate less energy at the drivers. It is an aspect of the operation not to modify most significant subfields, and to toggle the least significant subfields which are toggling candidates. In order to avoid destroying the darker parts of the pictures, the total cell subfield energy starting from the most significant subfields is integrated, and only if a given energy threshold is reached for a cell, the toggling process starts. In such a way, every cell of the display panel receives a part of the total available energy avoiding visible artifacts in the displayed picture. The proposed solution reduces data driver power dissipation by modifying subfield data in such a way that most significant subfields remain unmodified and least significant subfields are toggled if by toggling a bit value less power dissipation occurs in the drivers. In this description, the terms toggling and to toggle mean alternating the bit value. In detail, an apparatus for reducing driver transition energy consumption as illustrated by a block diagram shown in FIG. 2 is recommended to be used as the driver energy control and protection circuit DECAP shown in FIG. 1. The driver energy control and protection circuit DECAP comprises a driver transition energy limitation circuit DTELC, which restricts the energy, which a cell causes in the driver related to said cell. The transition energy limitation circuit DTELC receives at the input three subfield codewords 3xsfi containing subfield information for three cells of the display in parallel as red, green and blue and delivers at the output three subfield codewords 3xsfo being the processed subfield information for the same cells, which generate less energy dissipation on the data driver and reduce the power consumption of the display device. The transition energy limitation circuit DTELC restricts transition energy per cell to different values and is therefore connected with an overheat and/or eco control circuit OHAECC providing a control value cell_energy_limit [7:0] for said transition energy limitation circuit DTELC. It means that a stronger energy restriction is applied with a lower control value cell_energy_limit [7:0] in the driver transition energy limitation circuit DTELC. As shown in FIG. 2, the overheat and/or eco control circuit OHAECC is connected to an overheat signal generator circuit OHSGC, which is e.g. a overheat signal generator as know from EP 1 821 278 A1. The overheat and/or eco control circuit OHAECC transforms the overheat value overheat [11:0] into a cell energy limit value cell_energy_limit [7:0]. If the overheat increases the overheat problem is more serious and the current cell energy limit value cell_energy_limit [7:0] has to be reduced. This is performed with said overheat and/or eco control circuit OHAECC for which an embodiment in a block diagram is illustrated in FIG. 3. FIG. 2 shows furthermore a subfield line memory SLM for storing output subfield codewords sfo and providing said output subfield codewords sfo for the overheat signal generator circuit OHSGC and transition energy limitation circuit DTELC. As mentioned above, if the overheat value overheat [11:0] is higher than a given threshold, the power dissipation is too high and the cell energy limit control value cell_energy_limit [7:0] has to be reduced. Said regulation of the overheat and/or eco control circuit OHAECC in response to the overheat value overheat [11:0] is performed once per video frame, as it is indicated by a video frame clock signal v_pulse in FIG. 2, however, also lower rates like once per two frames are also possible.

FIG. 3 shows in a block diagram an overheat and/or eco control circuit OHAECC according to an embodiment of the invention. The overheat and/or eco control circuit OHAECC comprises a first and a second comparator CP1, CP2 both supplied by the overheat signal overheat [11:0] for comparing a current overheat value overheat [11:0] with a high overheat threshold OVERHEAT_HIGH [11:0] and a low overheat threshold OVERHEAT_LOW [11:0]. Each of the comparators CP1, CP2 is connected with a corresponding switch S1, S2 providing a as a result of said comparison a bit value '0' or '1' for a first adder ADD1 in a control loop to generate the cell energy limit control value cell_energy_limit [7:0]. In case that a current overheat value overheat [11:0] exceeds the high overheat threshold OVERHEAT_HIGH [11:0] the cell energy limit control value cell_energy_limit [7:0] is reduced and in case that a current overheat value overheat [11:0] exceeds the low overheat threshold OVERHEAT_LOW [11:0] the cell energy limit control value cell_energy_limit [7:0] is increased. The control loop comprises said adder ADD1, a limiter L build from a minimum-maximum circuit MIN MAX and a D-Flip-Flop FF having an enable input en supplied with said video frame clock signal v_pulse. The cell energy limit control value cell_energy_limit [7:0] is provided at the output of said D-Flip-Flop FF. The minimum-maximum circuit MIN MAX is a limiter L which by a maximum avoids an underflow and a minimum avoids an overflow. In other words, said minimum-maximum circuit MIN MAX is a limiter L to ensure a 8-bit range of 0-255. If the value next energy limit [9:0] becomes higher than 255, the MIN with 255 will choose 255, avoiding in this way an overflow; and if next energy limit [9:0] becomes negative, the MAX function will choose 0, avoiding in this way an underflow.

The complete bit range 0-255 is used for overheat protection and the value 255 of the 0-255 limiter L is adjusted to a lower value for the energy saving eco mode function ECO-mode. In said eco mode ECO-mode, the limiter L restricts to a range 0—predetermined control_energy_limit [7:0].

This means that the overheat and/or eco control circuit OHAECC even in the absence of an overheat signal overheat [11:0] provides a cell energy limit control value cell_energy_limit [7:0]. That means that an overheat signal overheat [11:0] advantageously and surprisingly also is used to realise an eco mode ECO-mode. During eco mode ECO-mode, for most of the overheat signals overheat [11:0], when there no overheating is detected, the cell energy limit control value cell_energy_limit [7:0] is equal to said predetermined control-energy-limit [7:0].

It seems to be strange, however, it is possible that overheating even occurs in the eco mode. The eco mode reduces energy dissipation and power consumption respectively by a predetermined factor, however, in case of a very extreme video signal, for instance a so-called pixel super-pattern it may be that overheating occurs. It happens less frequently but it may happen. So even in eco mode overheating protection is required, which is active only for more extreme signals. The overheat and/or eco control circuit OHAECC, in detail shown in FIG. 3, works also in such a case reliable as −1 is added to the cell energy limit control value cell_energy_limit [7:0], which reduces the cell energy limit control value cell_energy_limit [7:0] to a value lower than the predetermined control-energy-limit [7:0] forcing the overheat and/or eco control circuit OHAECC to reduce the output power consumption below a value predetermined for said eco mode.

That means that the recommended overheat and/or eco control circuit OHAECC advantageously with low expenditure is used for driver overheat protection as well as for an eco mode.

Figure 4:
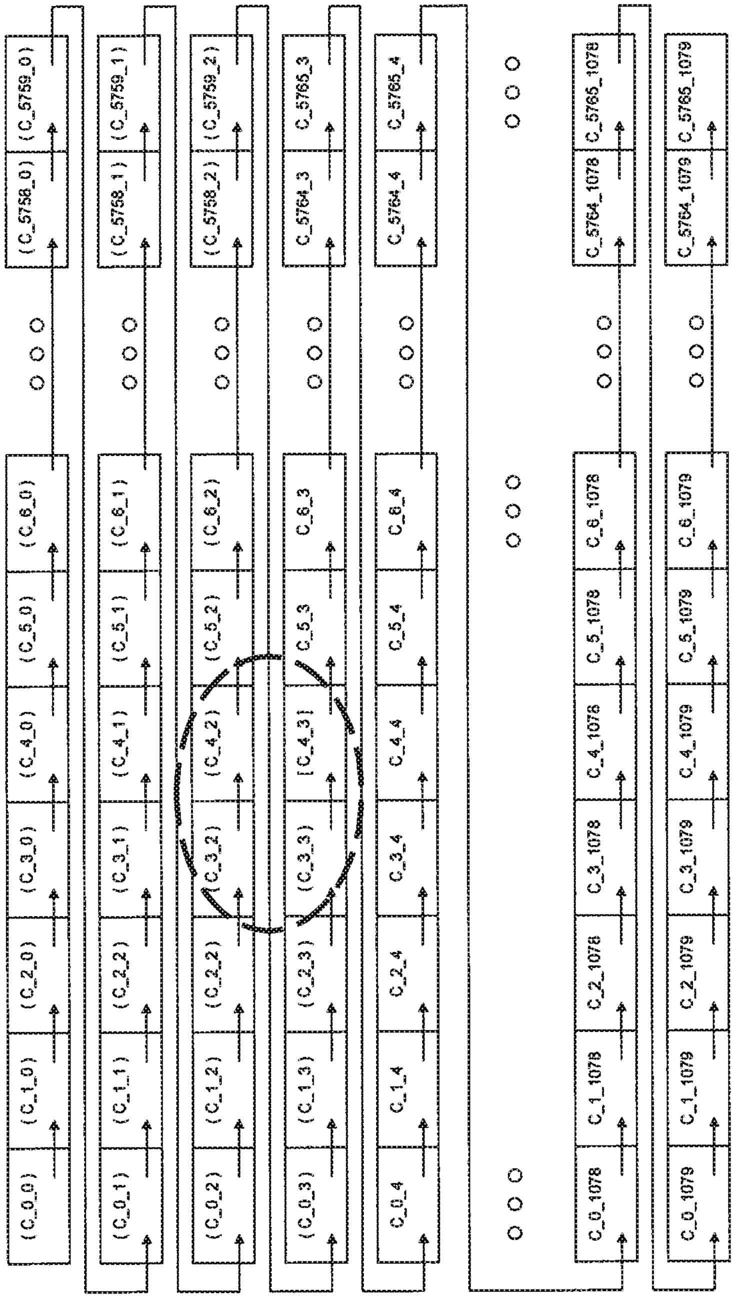

It is an aspect of the invention to limit on a cell by cell basis the transition energy available for each cell. Therefore the invention is based on a subfield replacing system, wherein for each cell the corresponding subfields are replaced by new ones that generate less energy on the data drivers. The number of subfields depends on the used plasma technology and is usually in the range from 9 to 16. Basically for each cell each subfield is inspected and if energy can be saved by toggling, the corresponding subfield is toggled. The most significant subfields are never toggled in order to prevent large visible artifacts. It has to be noted that the three cells of a display panel form a pixel and the cells are operated from left to right and from top to bottom. It is a recursive algorithm. FIG. 4 illustrates the processing order of cells C_0_0 to C_5765_1079, wherein a column of cells C_0_0, C_0_1, C_0_2, C_0_3, C_0_4, . . . C_0_1078, C_0_1079 e.g. belongs to the read colour and the following columns belong to green and blue and said order of colours is repeatedly used over the complete display. As mentioned above, it is an aspect of the invention to take into account the energy level of neighbouring cells. That means that e.g. for processing a current cell as e.g. a cell C_4_3 input subfields of the top cell C_4_2, input subfields of the left cell C_3_3 and input subfields of the top left cell C_3_2, which already have been processed, have to be evaluated. Said cells are as an example in FIG. 4 surrounded by a dashed line. In the following description of an example for an embodiment an application will be assumed, where the video signal to be displayed is encoded by 16 subfields and the corresponding subfields of the cells are determined in a general manner as 16 input subfields of the top cell sfo_t [15:0],
16 input subfields of the left cell sfo_l [15:0], 16 input subfields of the top left cell sfo_tl [15:0] and
16 input subfields of the input cell being processed sfi [15:0].

Figure 5:
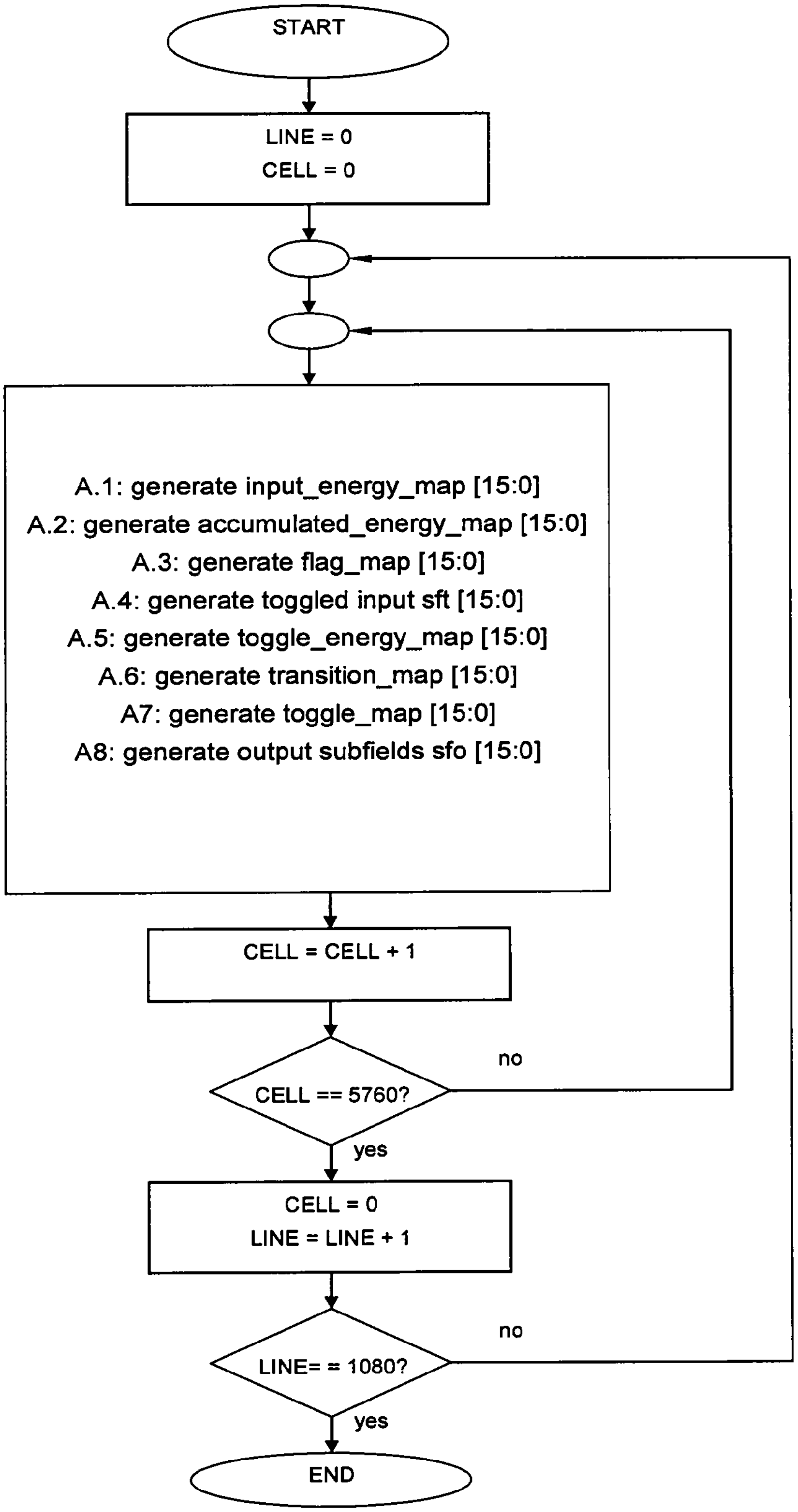

Furthermore, a value of transition energy limit allowed per panel cell cell_energy_limit [7:0] shall be assumed as available input signal and 16 output subfields of the processed cell sfo [15:0] shall be provided as output signal. With said definition the method comprises the following steps:

A.1: generation of an input energy map: input_energy_map [15:0]
A.2: generation of an accumulated energy map: accumulated_energy_map [15:0]
A.3: generation of a flag map: flag_map [15:0]
A.4: generation of a toggled input: sft [15:0]
A.5: generation of a toggled energy map: toggle_energy_map [15:0]
A.6: generation of a transition map: transition_map [15:0]
A.7: generation of a toggle map: toggle_map [15:0]
A.8: generation of output subfields: sfo [15:0] are performed to reduce bit transition. Said method steps are illustrated in a flowchart in FIG. 5, which indicates that said steps are performed for each cell in each line of the display panel.

According to the invention, transitions have to be evaluated concerning a resulting driver power dissipation. Therefore, an energy lookup table LUT is used, which as a model represents driver power dissipation in view of said neighboring cells. The following values have been determined as an example for a model to determine driver power dissipation in view of transitions in cells, as a vertical coupling transition shall be in case of no transition equal to 0, a simple transition equal to 1 and horizontal transitions in case of no transition equal 0, in case of a simple transition equal 3 and in case of a double transition equal to 6. With respect to the cells as determined above, it results in the following energy lookup table LUT, which is used to generate energy maps.

| top left cell sfo_tl | top cell sfo_t | left cell sfo_l | cell sfi | horizontal transition | vertical transition | total |
|---|---|---|---|---|---|---|
| 0 | 0 | 0 | 0 | no (0) | no (0) | 0 |
| 0 | 0 | 0 | 1 | simple (3) | simple (1) | 4 |
| 0 | 0 | 1 | 0 | simple (3) | no (0) | 3 |
| 0 | 0 | 1 | 1 | no (0) | simple (1) | 1 |
| 0 | 1 | 0 | 0 | simple (3) | simple (1) | 4 |
| 0 | 1 | 0 | 1 | no (0) | no (0) | 0 |
| 0 | 1 | 1 | 0 | double (6) | simple (1) | 7 |
| 0 | 1 | 1 | 1 | simple (3) | no (0) | 3 |
| 1 | 0 | 0 | 0 | simple (3) | no (0) | 3 |
| 1 | 0 | 0 | 1 | double (6) | simple (1) | 7 |
| 1 | 0 | 1 | 0 | no (0) | no (0) | 0 |
| 1 | 0 | 1 | 1 | simple (3) | simple (1) | 4 |
| 1 | 1 | 0 | 0 | no (0) | simple (1) | 1 |
| 1 | 1 | 0 | 1 | simple (3) | no (0) | 3 |
| 1 | 1 | 1 | 0 | simple (3) | simple (1) | 4 |
| 1 | 1 | 1 | 1 | no (0) | no (0) | 0 |

That means that in case of the following subfield values
sfo_tl [15:0]=0010 0010 1111 1111
sfo_t [15:0]=0010 0110 1010 1010
sfo_l [15:0]=0000 0110 1010 1010
sfi [15:0]=0000 1011 1111 1111
by bitwise applying the energy lookup table LUT an
input_energy_map [15:0]=0010 4704 0707 0707
is generated as method step A.1.

The following step A.2: generation of an accumulated energy map accumulated_energy_map [15:0] means that the bits of the input_energy_map [15:0]=0010 4704 0707 0707, starting with the most significant subfield, which corresponds to the most significant bit, are accumulated with the result that a flag map flag_map [15:0] will be derived from said accumulated energy map accumulated_energy_map [15:0]. That means in this example:

| input_energy_map [15:0] | accumulated_energy_map [15:0] | flag_map [15:0] |
|---|---|---|
| 0 | 0 = 0 | 0 |
| 0 | 0 = 0 + 0 | 0 |
| 1 | 1 = 0 + 0 + 1 | 0 |
| 0 | 1 = 0 + 0 + 1 + 0 | 0 |
| 4 | 5 = 0 + 0 + 1 + 0 + 4 | 0 |
| 7 | 12 = 0 + 0 + 1 + 0 + 4 + 7 | 0 (energy limit reached) |
| 0 | 12 = 0 + 0 + 1 + 0 + 4 + 7 + 0 | F |
| 4 | 16 = 0 + 0 + 1 + 0 + 4 + 7 + 0 + 4 | F |
| 0 | 23 = 0 + 0 + 1 + 0 + 4 + 7 + 0 + 4 + 7 | F |
| 7 | 23 = 0 + 0 + 1 + 0 + 4 + 7 + 0 + 4 + 7 + 0 | F |
| 0 | 30 = 0 + 0 + 1 + 0 + 4 + 7 + 0 + 4 + 7 + 0 + 7 | F |
| 7 | 30 = 0 + 0 + 1 + 0 + 4 + 7 + 0 + 4 + 7 + 0 + 7 + 0 | F |
| 0 | 37 = 0 + 0 + 1 + 0 + 4 + 7 + 0 + 4 + 7 + 0 + 7 + 0 + 7 | F |
| 7 | 37 = 0 + 0 + 1 + 0 + 4 + 7 + 0 + 4 + 7 + 0 + 7 + 0 + 7 + 0 | F |
| 0 | 44 = 0 + 0 + 1 + 0 + 4 + 7 + 0 + 4 + 7 + 0 + 7 + 0 + 7 + 0 + 7 | F |
| 7 | 44 = 0 + 0 + 1 + 0 + 4 + 7 + 0 + 4 + 7 + 0 + 7 + 0 + 7 + 0 + 7 + 0 | F |

As shown above, the flag_map [15:0] contains an flag F for subfields where the accumulated_energy_map [15:0] is equal or higher in comparison to an input value cell_energy_limit [7:0]. This results from the assumption that the current value of the cell energy limit cell_energy_limit [7:0] is equal 12, so that the corresponding flag map reads:

flag_map [15:0]=0000 00FF FFFF FFFF

This means that if the accumulated energy value reaches the cell energy limit all of the following subfields are flagged for a possible toggling.

The following step A.4: generation of a toggled input: sft [15:0] means inversion of the input subfields sfi [15:0]=0000 1011 1111 1111 resulting to sft [15:0]=1111 0100 0000 0000.

The following step A.5: generation of a toggled energy map toggle_energy_map [15:0] means the energy lookup table LUT mentioned above is now applied to the toggled input sft [15:0]=1111 0100 0000 0000 instead of the input_energy_map [15:0], which means that said energy lookup table LUT has to be applied to sfo_tl [15:0]=0010 0010 1111 1111 sfo_t [15:0]=0010 0110 1010 1010 sfo_l [15:0]=0000 0110 1010 1010 sft [15:0]=1111 0100 0000 0000 for generating the toggle_energy_map [15:0]=4434 0340 4343 4343.

The following step A.6: generation of a transition map: transition_map [15:0] means a comparison between input_energy_map [15:0]=0010 4704 0707 0707 and toggle_energy_map [15:0]=4434 0340 3434 3434 to determine subfields and bits respectively, that if toggled, that means if the value of the bit is altered, generate less power consumption in the driver.

Consequently, the transition map: transition_map [15:0], wherein subfields, that if toggled generate less power consumption in the driver are indicated by a + and bits which shall not be toggled are indicated by – looks as follows in this example.

transition_map [15:0]=– – – – ++–+ –+–+ –+–+

The following step A.7: generation of a toggle map: toggle_map [15:0] means that transition map transition_map [15:0] and the flag map flag_map [15:0] are combined as shown below. The toggle map contains a toggle T for those subfields where an lag F occurs in the flag map and a + as determined above occurs in the transition map.

transition_map [15:0]=– – – – ++ –+ –+ –+ –+ –+ flag_map [15:0]=0000 00FF FFFF FFFF toggle_map [15:0]=– – – – – – – – T –T –T –T–T Finally, in a step A.8: generation of output subfields: sfo [15:0], the toggle map is applied to input subfields of the input cell being processed sfi [15:0] as shown in the following:

sfi [15:0]=0000 1011 1111 1111 toggle_map [15:0]=– – – – – – – – T –T –T –T ––T and output subfields of the processed cell sfo [15:0] are generated to sfo [15:0]=0000 1010 1010 1010 by alternating the value of bits in the input codeword, which have been determined by said toggle_map [15:0]. A comparison between input codeword and processed codeword sfo illustrates that the power consumption is reduce although the processed codeword has more transitions inside the codeword.

Figure 6:
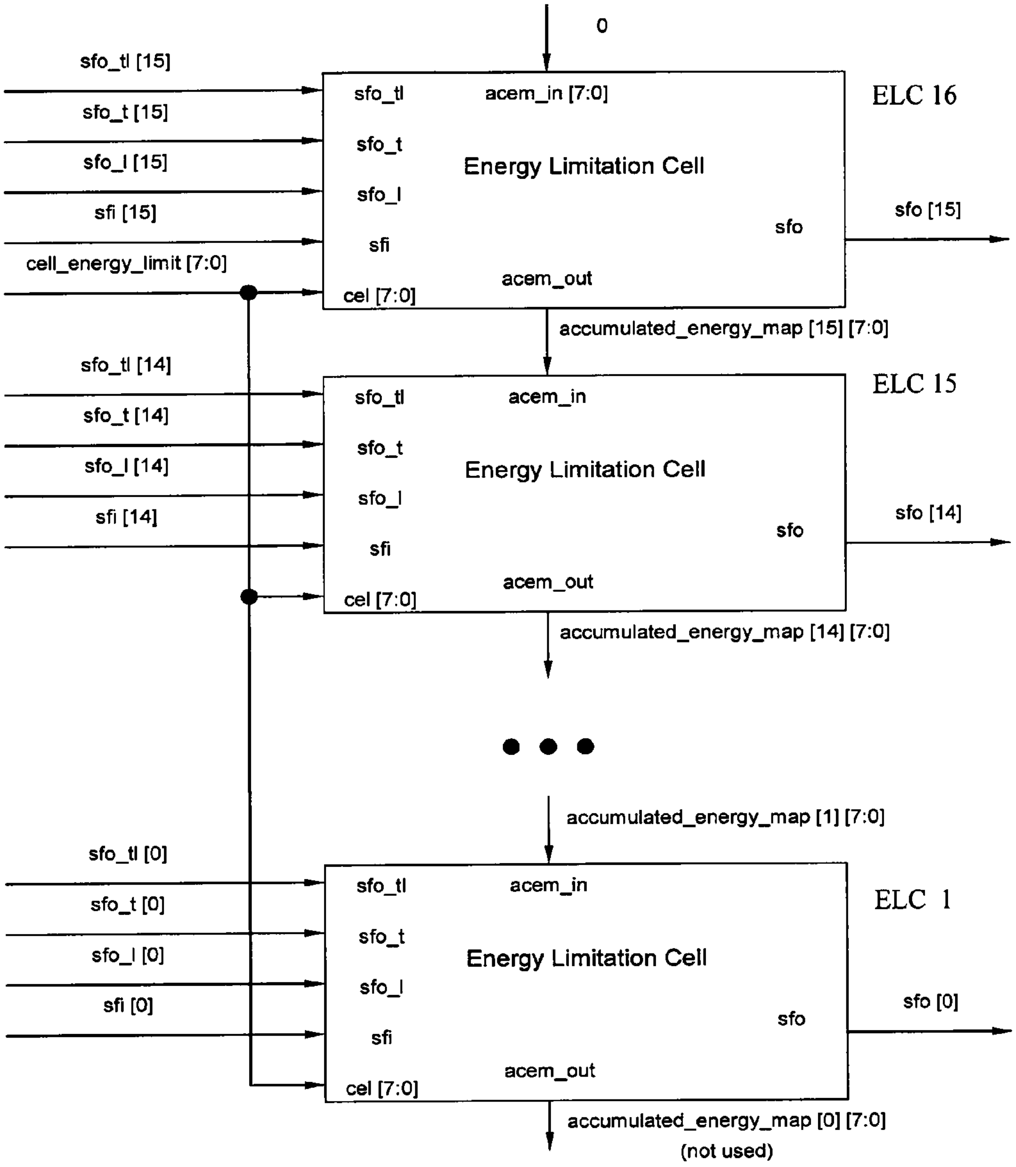
Figure 7:
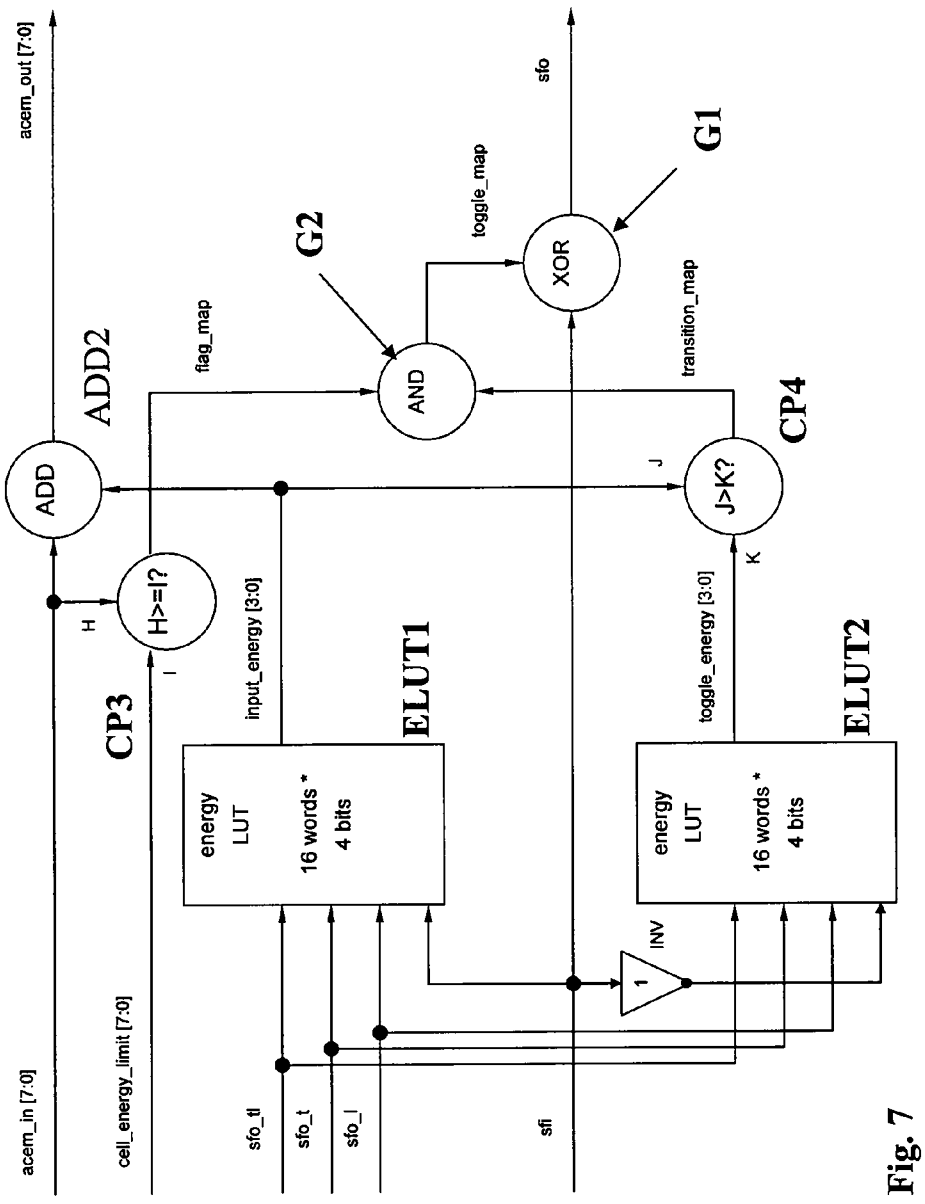

The method is performed with an transition energy limitation circuit DTELC, shown in FIG. 2, which in more details is illustrated by a block diagram of the driver transition energy circuit DTELC, shown in FIG. 6. The transition energy limitation circuit DTELC comprises 16 identical energy limitation cells Energy Limitation Cell in parallel for processing the signals mentioned above as shown in FIG. 7. That means that for each subfield an energy limitation cell Energy Limitation Cell is provided and said energy limitation cells Energy Limitation Cell are controlled by the cell energy limit value cell_energy_limit [7:0] applied to the transition energy limitation circuit DTELC. FIG. 7 illustrates an embodiment of an apparatus to perform the method as generating for a current subfield codeword sfi an input_energy [3:0] signal by using a first energy lookup table ELUT1 and generating a toggle_energy [3:0] signal by applying the current subfield codeword sfi, which has been before inverted by an inverter INV, to a second energy lookup table ELUT2. As the same energy lookup table LUT may be used to generate said signals, it is also possible to use the energy lookup table LUT twice. A third comparator CP3 compares an accumulated energy map value acem_in [7:0] with a current cell energy limit value cell_energy_limit [7:0] to provide the flag_map and a fourth comparator CP4 compares the input_energy [3:0] signal with the toggle_energy [3:0] signal to generate the transition map. Furthermore, as mentioned above in method step A.7., transition_map and flag_map are combined to a toggle_map. Therefore, according to FIG. 7 a second gate G2 is provided, which is an AND-gate AND in this embodiment and a first gate G1 is provided to toggle bits in a current subfield codeword sfi to provide a subfield codeword sfo, which reduces the power consumption of the driver. Said toggling may e.g. may be performed with an XOR-gate XOR, so that a XOR-gate XOR is used to realise the first gate G1. The energy limitation cell Energy Limitation Cell as illustrated in FIG. 7 comprises furthermore a second adder ADD2 to increment or decrement the accumulated energy map signal according to the input energy value applied to said adder ADD2.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the claims.

The invention claimed is:

1. Method for reducing driver energy consumption of data drivers of a plasma display panel supplied by sequences of subfield data bits in form of a codeword having a predetermined number of bits, wherein energy associated to a cell is calculated by departing from values of neighboring cells in the same subfield, both in cases in which the bit corresponding to image data would be displayed and in a case in which a bit corresponding to the image data is inverted/toggled, the method comprising for each subfield:

evaluating an input transition energy caused by bit transitions at the input of a data driver using a predetermined data driver power dissipation model, an input subfield bit value and the subfield bit value of neighbor cells, evaluating a toggle transition energy caused by toggle transitions using a predetermined data driver power dissipation model being a model representing data driver power dissipation, an inverted input subfield bit value and the subfield bit value of neighbor cells, accumulating the input transition energy from subfield to subfield, and inverting an input subfield bit if said accumulated input transition energy exceeds a cell energy limit value and if said toggle transition energy is smaller than said input transition energy to reduce driver energy consumption without a perceivable image quality degradation.

2. Method according to claim 1, wherein the cell energy limit value is provided by an overheat or eco control circuit generating said cell energy limit value according to an eco mode and/or from an overheat signal provided by an overheat signal generator circuit which counts sub-field data bits, a value of which differs from that of a neighboring or preceding sub-field data bit and provides a respective signal being a measure of an amount of toggling activity representative of a rise in temperature of a driver for driver overheat protection.

3. Method according to claim 1, wherein the method is used for driver overheat protection.

4. Method according to claim 1, wherein the method is used to provide a eco mode to reduce driver energy consumption without a perceivable image quality degradation.

5. Method according to claim 1, further comprising generating a transition map denoting a bit that, if toggled, reduces the driver energy consumption, by comparing an input energy signal for a cell of the display device with a toggle energy signal for said cell of the display device.

6. Apparatus for reducing driver energy consumption of data drivers of a plasma display panel supplied by sequences of subfield data bits in the form of a codeword comprising a predetermined number of bits, wherein an energy associated to a cell is calculated by departing from values of adjacent cells in the same subfield, both in a case in which a bit corresponding to image data would be displayed and in a case in which the bit corresponding to the image data is inverted/toggled and the apparatus comprises a driver transition energy limitation circuit performing the method according to claim 1 for toggling bits of an input codeword applied to the driver transition energy limitation circuit and providing a codeword reducing the driver energy consumption.

7. Apparatus according to claim 6, wherein the driver transition energy limitation circuit is connected with an overheat or eco control circuit converting an overheat value into a cell energy limit value to control said driver transition energy limitation circuit.

8. Apparatus according to claim 6, wherein the driver transition energy limitation circuit comprises a first gate for toggling bits of the input codeword applied to the driver transition energy limitation circuit.

9. Apparatus according to claim 8, wherein the first gate for toggling bits of the input codeword is an XOR-gate.

10. Plasma display device, wherein an apparatus according to claim 6 is arranged.

* * * * *